United States Patent
Jeong et al.

(10) Patent No.: US 9,933,067 B2
(45) Date of Patent: Apr. 3, 2018

(54) AUTOMATIC TRANSMISSION FLUID WARMER COOLANT CIRCULATION SYSTEM AND DESIGN METHOD THEREOF

(71) Applicants: Hyundai Motor Company, Seoul (KR); Kia Motors Corporation, Seoul (KR)

(72) Inventors: Chi-Weon Jeong, Whasung-Si (KR); Hyo-Chan Bae, Whasung-Si (KR); Young-Bae Yang, Whasung-Si (KR); Young-Jin Choi, Whasung-Si (KR); Joong-Su Yun, Whasung-Si (KR); Ki-Lyong Jang, Whasung-Si (KR); Seung-Ho Mok, Whasung-Si (KR); Kwang-Weon Ahn, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 116 days.

(21) Appl. No.: 14/927,418

(22) Filed: Oct. 29, 2015

(65) Prior Publication Data

US 2016/0273647 A1  Sep. 22, 2016

(30) Foreign Application Priority Data

Mar. 19, 2015  (KR) .................. 10-2015-0038097

(51) Int. Cl.
*F16H 57/04*  (2010.01)
*F16H 57/00*  (2012.01)

(52) U.S. Cl.
CPC ...... *F16H 57/0475* (2013.01); *F16H 57/0413* (2013.01); *F16H 2057/0087* (2013.01)

(58) Field of Classification Search
CPC .... F01P 2060/04; F01P 7/14; F01P 2060/045; F01P 11/08; F01P 2060/18
See application file for complete search history.

(56) References Cited

U.S. PATENT DOCUMENTS

| | | | | |
|---|---|---|---|---|
| 3,566,718 | A * | 3/1971 | Wightman | B60K 17/10 477/156 |
| 6,520,136 | B2 * | 2/2003 | Ito | F02N 19/10 123/142.5 R |
| 8,409,055 | B2 * | 4/2013 | Gooden | F01M 5/001 165/41 |
| 8,881,693 | B2 * | 11/2014 | Hayashi | F01P 7/167 123/41.01 |
| 2002/0029755 | A1 * | 3/2002 | Ito | F02N 19/10 123/142.5 R |

(Continued)

FOREIGN PATENT DOCUMENTS

| | | |
|---|---|---|
| JP | 8-183324 A | 7/1996 |
| JP | 2002-161747 A | 6/2002 |

(Continued)

*Primary Examiner* — Long T Tran

(74) *Attorney, Agent, or Firm* — Morgan, Lewis & Bockius LLP

(57) ABSTRACT

An automatic transmission fluid (ATF) warmer coolant circulation system may include an ATF warmer connected to an engine oil cooler, in which engine coolant is circulated to the ATF warmer to preheat automatic transmission fluid of a transmission below an operation temperature of the ATF warmer.

11 Claims, 5 Drawing Sheets

(56) References Cited

U.S. PATENT DOCUMENTS

| | | | | |
|---|---|---|---|---|
| 2009/0236435 A1* | 9/2009 | Kudo | ............... | F01P 11/20 237/12.3 B |
| 2010/0218642 A1* | 9/2010 | Leichsenring | ...... | F16H 57/0413 74/606 A |
| 2011/0111920 A1* | 5/2011 | Gooden | ............ | F01M 5/001 477/98 |
| 2012/0048504 A1* | 3/2012 | Park | ............... | B60H 1/00778 165/41 |
| 2012/0118542 A1* | 5/2012 | Kanzaka | ............ | F28F 3/025 165/148 |
| 2014/0007824 A1* | 1/2014 | Hayashi | ............ | F01P 7/167 123/41.01 |
| 2014/0069522 A1* | 3/2014 | Kuze | ............ | F01P 7/14 137/334 |
| 2014/0372008 A1* | 12/2014 | Bockenstette | ......... | F01P 7/162 701/102 |

FOREIGN PATENT DOCUMENTS

| | | | |
|---|---|---|---|
| JP | 2004-360460 A | 12/2004 | |
| JP | 2010-174712 A | 8/2010 | |
| JP | 2012-218673 A | 11/2012 | |

\* cited by examiner

FIG. 3A

[COOLANT/OIL TEMPERATURE VARIATION AT 60°C OR LESS CONDITION]

| DIVISION | REFERENCE | COMPARE1 | COMPARE2 | COMPARE3 | EXEMPLARY EMBODIMENT |
|---|---|---|---|---|---|
| COOLANT TEMPERATURE | 56 | 60 | 56 | 57 | 56 |
| ENGINE OIL/TRANSMISSION OIL | 69~70% | 55% | 78% | 59% | 80% |

FIG. 3B

[COOLANT/OIL TEMPERATURE VARIATION AT 60°C OR LESS CONDITION]

| DIVISION | REFERENCE | COMPARE1 | COMPARE2 | COMPARE3 | EXEMPLARY EMBODIMENT |
|---|---|---|---|---|---|
| COOLANT TEMPERATURE | 56 | 60 | 56 | 57 | 56 |
| TRANSMISSION OIL/ENGINE OIL | 147% | 184% | 126% | 169% | 125% |

AUTOMATIC TRANSMISSION FLUID WARMER COOLANT CIRCULATION SYSTEM AND DESIGN METHOD THEREOF

CROSS-REFERENCE TO RELATED APPLICATION

The present application claims priority to Korean Patent Application No. 10-2015-0038097, filed Mar. 19, 2015, the entire contents of which is incorporated herein for all purposes by this reference.

BACKGROUND OF THE INVENTION

Field of the Invention

The present invention relates to an automatic transmission fluid warmer coolant circulation system and design method thereof, and more particularly, to an automatic transmission fluid warmer coolant circulation system and design method thereof capable of preheating Automatic Transmission Fluid (ATF) in the low temperature condition of 70 degrees or less of the engine coolant.

Description of Related Art

In recent years, due to global high oil prices and $CO_2$ regulation, as fuel efficiency improvement and eco-friendly property have been treated as key items in the vehicle development, automobile manufacturers have devoted all its efforts on a variety of technical developments for fuel reduction.

Among such technologies, an ATF warmer coolant circulation system is a way of improving the fuel efficiency by further improving the transfer efficiency of an automatic transmission. The ATF warmer coolant circulation system is configured to apply an ATF warmer in which heat-exchange takes place by the circulation of ATF and engine coolant, install a bypass valve at a connection portion between an ATF line and an engine coolant line, and connect the bypass valve with a controller. Therefore, in the ATF warmer coolant circulation system, the ATF of a low temperature heat-exchanges with the engine coolant of a high temperature through the bypass valve opened by the control of the controller at a preset engine coolant temperature such that the temperature rise in the ATF takes place, and also, the elevated temperature ATF is circulated into the automatic transmission, whereby the transfer efficiency of the automatic transmission is improved. At this case, the engine coolant is circulated in the order of an engine→a heater core→an ATF warmer→the engine. Herein, "→" refers to the flow direction of the engine coolant.

For this, the ATF warmer coolant circulation system applies the engine coolant temperature of about 70° C. or more as an operation temperature, a controller opens the bypass valve at 70° C. or more but closes the bypass valve at 70° C. or less based on the engine coolant temperature of about 70° C. The controller applies an engine Electric Control Unit (ECU) or a Transmission Control Unit (TCU).

However, the conventional ATF warmer coolant circulation system applies the dualization of the ATF line and the engine coolant line, and the flow control valve type bypass vale in order to improve the fuel efficiency and maintain heating performance under the low temperature condition, such that it is bound to have system limitations which should make the engine coolant temperature of about 70° C. or more as the operation temperature even though the transmission transfer efficiency goes to the maximum at the ATF temperature of about 60° C. or more.

In particular, the bypass valve of the conventional ATF warmer coolant circulation system is installed at a front end of the ATF warmer, such that the heater core side flow rate is increased by the engine coolant not passing through the ATF warmer when the bypass valve is closed at 70° C. or less, whereas the ATF temperature rise is delayed when the bypass valve is opened at 70° C. or more due to the ATF preheating impossibility whereby it inevitably lacks the performance for the fuel efficiency improvement due to the low transmission transfer efficiency.

Therefore, in the conventional ATF warmer coolant circulation system, the improved technologies that can maintain heating performance in a low temperature condition and properly implement the fuel efficiency improvements through the transmission transfer efficiency improvements by rapid temperature rise of the ATF, have been required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an automatic transmission fluid (ATF) warmer coolant circulation system and design method thereof capable of increasing transmission transfer efficiency and improving fuel efficiency through rapid rise of ATF temperature at 70° C. or more operation conditions by preheating ATF even when maintaining heating performance at the low temperature condition of 70° C. or less, and more particularly, reducing cost and weight by coolant line downsizing and valve elimination through the serial layout of an engine oil cooler and an ATF warmer.

According to various aspects of the present invention, an automatic transmission fluid (ATF) warmer coolant circulation system, may include an ATF warmer connected to an engine oil cooler, in which engine coolant is circulated to the ATF warmer in order to preheat automatic transmission fluid of a transmission below an operation temperature of the ATF warmer.

The automatic transmission fluid (ATF) warmer coolant circulation system may further include an ATF coolant line for introducing engine coolant, and an ATF line for circulating the ATF.

The engine coolant may be configured to be supplied to the ATF warmer after passing through the engine oil cooler connected to an engine and then returned to the engine, and the ATF may be supplied to the ATF warmer through an ATF line connected to the transmission and then returned to the transmission.

The ATF warmer may form an ATF heat-exchanging line therein, and the engine coolant flowing in the ATF heat-exchanging line and the ATF flowed in through the ATF line may be heat-exchanged with each other.

The engine oil cooler and the ATF warmer may be connected via an ATF coolant line, and the ATF coolant line may be connected with a coolant return line for returning the engine coolant to the engine.

A coolant outlet nipple for discharging the engine coolant to the outside is further provided to the engine oil cooler.

A diameter of the coolant outlet nipple may be determined by the relationship between an internal flow resistance of the engine oil cooler and an ATF temperature rise of the ATF warmer.

A thermostat and a water pump may be installed at the coolant return line, and the ATF coolant line may be connected between the thermostat and the water pump.

The coolant return line may be configured to be withdrawn from a radiator, and the radiator may be connected with the engine via the coolant return line.

A heater core coolant line configured to be withdrawn from the engine and at which a heater core is installed may be connected to the coolant return line, and the heater core coolant line and the ATF coolant line may be separated from each other.

According to various aspects of the present invention, a design method of an automatic transmission fluid (ATF) warmer coolant circulation system may include system building, where an ATF warmer and an engine oil cooler are selected, the ATF warmer is connected to the engine oil cooler via an ATF coolant line to comprise the ATF warmer coolant circulation system so that the ATF of an transmission circulating the ATF warmer can be preheated by heat-exchanging with engine coolant passing through a coolant outlet nipple of the engine oil cooler, and the ATF warmer coolant circulation system is built as an engine system along with an engine, an engine cooling system and a heater core, optimization analysis, where the engine system is operated, the effects of the engine coolant flow rate passing through a specific diameter of the coolant outlet nipple on an engine oil temperature drop and on an ATF temperature rise are detected according to change of the engine coolant temperature of 70° C. or less and that is repeatedly performed with changing the diameter of the coolant outlet nipple, and the repeated experiment results are analyzed as performance by engine coolant temperature at an experiment device connected with an engine Electronic Control Unit (ECU), and nipple diameter optimization, where the diameter of the coolant outlet nipple applied to the engine oil cooler is selected to a diameter representing the higher ATF temperature rise than the engine oil temperature drop among a number of experimented diameters.

The diameter selection of the coolant outlet nipple may be achieved at the lowest coolant temperature.

The diameter selection of the coolant outlet nipple may be achieved at the coolant temperature higher ATF temperature rise value than engine oil temperature drop value among same coolant temperatures.

Such the ATF warmer coolant circulation system of the present invention is configured in a serial manner of the engine oil cooler and the ATF warmer such that the coolant flows from the engine→the engine oil cooler→the ATF warmer→to the engine, thereby achieving the following effects.

Firstly, the fuel efficiency improvement ratio can be further enhanced through the transmission transfer efficiency improvement by changing the coolant line layout for the ATF temperature rising slope increase in a low temperature condition.

Secondly, cost and weight can be reduced through the hose length downsizing by the coolant line simplification.

Thirdly, cost and weight can be further reduced by the elimination of flow control valve applied for heating performance maintenance in the low temperature condition due to the flow rate reduction minimum of heater core side.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
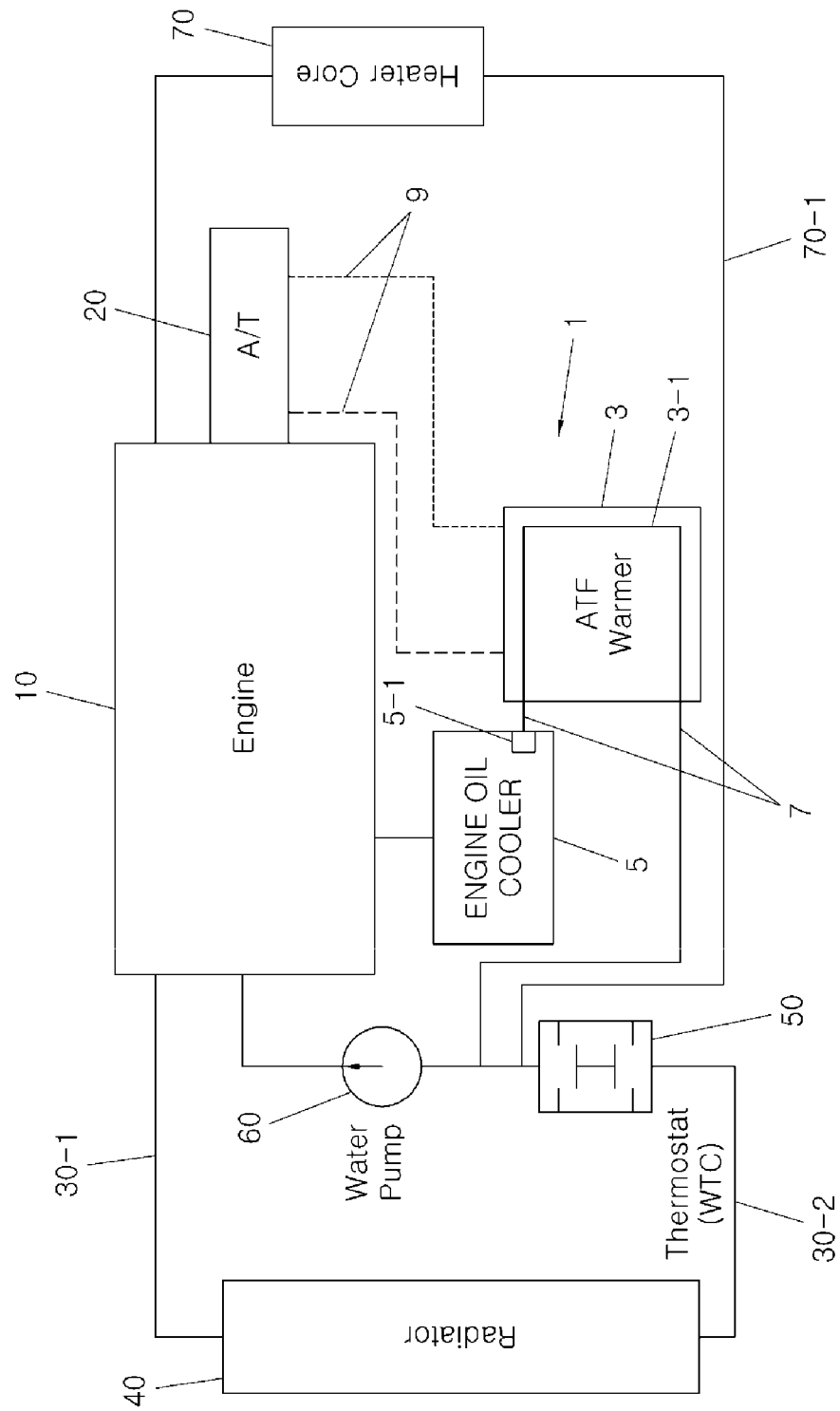
FIG. 1 is a diagram of an ATF warmer coolant circulation system according to the present invention.

FIG. 1 is a diagram of an Automatic Transmission Fluid (ATF) warmer coolant circulation system according to the present invention.

As shown, an ATF warmer coolant circulation system 1 may be configured with an ATF warmer 3 connected with an engine oil cooler 5, an ATF coolant line 7 for introducing engine coolant, and an ATF line 9 for circulating the ATF. The ATF warmer coolant circulation system 1 may be connected with an engine cooling system in order to introduce the engine coolant but independently configured with respect to a heater core 70.

Concretely, the ATF warmer 3 heats the ATF flowed out of a transmission 20 through the engine coolant and again supplies it to the transmission 20. For this, the ATF warmer 3 may be formed with an ATF inner line along with an ATF heat-exchanging line 3-1 through which the engine coolant flows. The ATF inner line may be configured to heat-exchange with the engine coolant flowing into the ATF heat-exchanging line 3-1 and connect to an inlet port and an outlet port of the ATF line 9. Since the ATF inner line and the ATF heat-exchanging line 3-1 are typical components of the ATF warmer 3, the detailed description thereof will be omitted.

Concretely, the engine oil cooler 5 is a typical component which can reduce the engine oil temperature, but may further include an outlet out which the engine coolant flowed into flows and a coolant outlet nipple 5-1 provided to the outlet. Particularly, the coolant outlet nipple 5-1 may be optimized for the flow rate of the engine coolant supplied to the ATF warmer 3. This is in order for fuel efficiency not to be adversely affected by that the internal flow resistance of the engine oil cooler 5 connected with the ATF warmer 3 delays the ATF temperature rise. For this, the ATF warmer coolant circulation system 1 may be designed by a coolant flow rate distribution optimization method and it will be described in detail referring to FIG. 2A and FIG. 2B.

Concretely, the ATF coolant line 7 may be configured with an inflow line connecting the engine oil cooler 5 with the ATF warmer 3 and an outflow line connecting the ATF warmer 3 with a coolant return line 30-2. The inflow line may be connected to the coolant outlet nipple 5-1 of the engine oil cooler 5 to be connected with the inlet of the ATF heat-exchanging line 3-1 of the ATF warmer 3, thereby sending the engine coolant flowed out of the engine oil cooler 5 to the ATF warmer 3. The outflow line may be connected to an outlet of the ATF heat-exchanging line 3-1 of the ATF warmer 3 to be connected with the coolant return line 30-2, thereby sending the engine coolant flowed out of the ATF warmer 3 to an engine 10 again.

Concretely, the ATF line 9 connects the transmission 20 to which the power of the engine 10 is transmitted with the ATF warmer 3, and may be configured with a low temperature ATF line through which the relatively low temperature ATF is sent from the transmission 20 to the ATF warmer 3. Furthermore, the ATF line 9 may be configured with a high temperature ATF line through which the high temperature ATF heated by heat-exchange is sent from the ATF warmer 3 to the transmission 20, formed separately with respect to the low temperature ATF line.

Concretely, the engine cooling system may be configured with a radiator 40 which is connected with the engine 10 through a coolant discharge line 30-1 and cools the high temperature engine coolant of the engine 10, a thermostat 50 installed at the coolant return line 30-2 which sends again the low temperature engine coolant flowed out of the radiator 40 to the engine 10, and a water pump 60 installed at the coolant return line 30-2 for pumping the engine coolant. The radiator 40, the thermostat 50 and the water pump 60 are components typically applied to the engine cooling system. Only, the ATF coolant line 7 is connected to the coolant return line 30-2 in the section of the coolant return line 30-2 which connects between the thermostat 50 and the water pump 60. Furthermore, a heater core coolant line 70-1 may be connected to the coolant return line 30-2 in the section of the coolant return line 30-2 which connects between the thermostat 50 and the water pump 60. The ATF coolant line 7 may have a close-up position to the water pump 60 than the heater core coolant line 70-1.

Concretely, the heater core 70 may be installed at the heater core coolant line 70-1 which comes out of the engine 10 to be connected to the coolant return line 30-2. The heater core 70 is the same as the conventional heater core for maintaining the heating performance at a low temperature condition.

Figure 2:
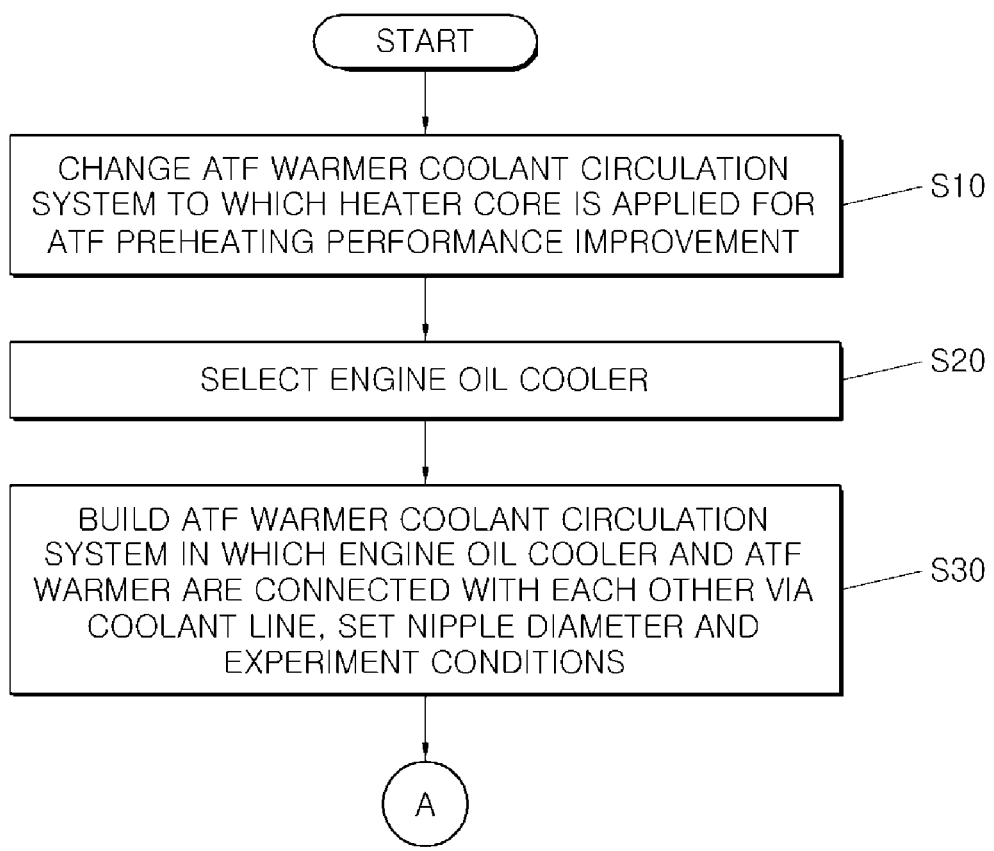
FIG. 2A and FIG. 2B are a flow chart of design method that the ATF warmer coolant circulation system according to the present invention can embody the ATF warmer coolant distribution optimization.

Meanwhile, FIG. 2A and FIG. 2B show the design method of the ATF warmer coolant circulation system 1 according to various embodiments of the present invention. The design method embodies the ATF warmer coolant distribution optimization such that the ATF warmer coolant circulation system 1 can be configured with only the ATF warmer 3 connected with the engine oil cooler 5 without applying the heater core 70 and flow control valves. The design method described hereafter may include the engine cooling system having the engine 10, the radiator 40, the thermostat 50 and the water pumper 60, the heater core 70, the ATF warmer 3 and the engine oil cooler 5, and may be applied to an engine system configured with lines for circulating the engine coolant, the engine oil and the ATF, and may be implemented through the experiment by that worker operates the engine system.

The steps of S10 to S30 are the processes in which new ATF warmer coolant circulation system is built. At S10, the worker may select an ATF warmer coolant circulation system to which the heater core is applied since it is necessary to improve the ATF preheating performance of the ATF warmer 3. At S20, the worker may select the engine oil cooler 5 as the ATF warmer preheating performance improvement element of the ATF warmer 3. At S30, the worker may connect the engine 10, the engine oil cooler 5 and the ATF warmer 3 via the ATF coolant line 7. At this case, the engine 10 may be configured along with the engine cooling system, the heater core 70 and the transmission 20 to establish a perfect engine system.

In this process, worker may select an engine oil cooler outlet flow rate of the engine coolant flowed out of the engine oil cooler 5 as coolant flow rate distribution optimization design element in the ATF warmer coolant circulation system 1. The engine oil cooler outlet flow rate may be changed by the diameter of the coolant outlet nipple 5-1 applied to the outlet of the engine oil cooler 5. Furthermore, the variable flow rate experiment of the engine oil cooler outlet flow rate separates an engine coolant temperature of 70° C. or less into a number of temperatures and the diameter of the coolant outlet nipple 5-1 may be applied to each of the separated temperatures. Therefore, the ATF warmer coolant circulation system 1 established by the worker may be operated with connected with an actual engine system, and may be repeatedly experimented with changing the diameter of the coolant outlet nipple 5-1.

The steps of S40 to S80 are the processes in which the engine oil cooler outlet flow rate of the coolant outlet nipple 5-1 set to any diameter is experimented at the engine coolant temperature of 70° C. or less separated into a first to nth different coolant temperatures (where n is an integer greater than or equal to 2). Therefore, the steps of S40 to S80 may be repeatedly performed with changing the diameter of the coolant outlet nipple 5-1, and as a result, may be finished when the diameter of the coolant outlet nipple 5-1 is suited to the coolant flow rate distribution optimization of the ATF warmer 3.

If the ATF warmer coolant circulation system 1 is operated along with the engine system, the engine coolant flowed out of the coolant outlet nipple 5-1 of the engine oil cooler 5 is sent to the ATF warmer 3 at the first coolant temperature at S40. And then, if the measurement results of the engine oil temperature and the ATF temperature are derived at S50, it is repeatedly done at the second . . . n (where n is an integer greater than or equal to 3) coolant temperatures higher than the first coolant temperature as S60, thereby deriving each of the measurement results of the engine oil temperature and the ATF temperature. At this time, to derive the measurement results may be repeatedly done by an experiment device connected to an engine Electronic Control Unit (ECU) or by an experiment device alone. The experiment device may be a typical device for similar experiment.

Subsequently, when the coolant temperature is not higher than the first coolant temperature, the worker analyses more effective outlet flow rate to a rise value of the ATF temperature than a drop value of the engine oil temperature at the lowest coolant temperature among the first to nth coolant temperature (where n is an integer greater than or equal to 2) as S70, and then, selects the coolant outlet nipple 5-1 having an optimal diameter as S80, thereby finishing the coolant flow rate distribution optimization of the ATF warmer 3.

Figure 3:
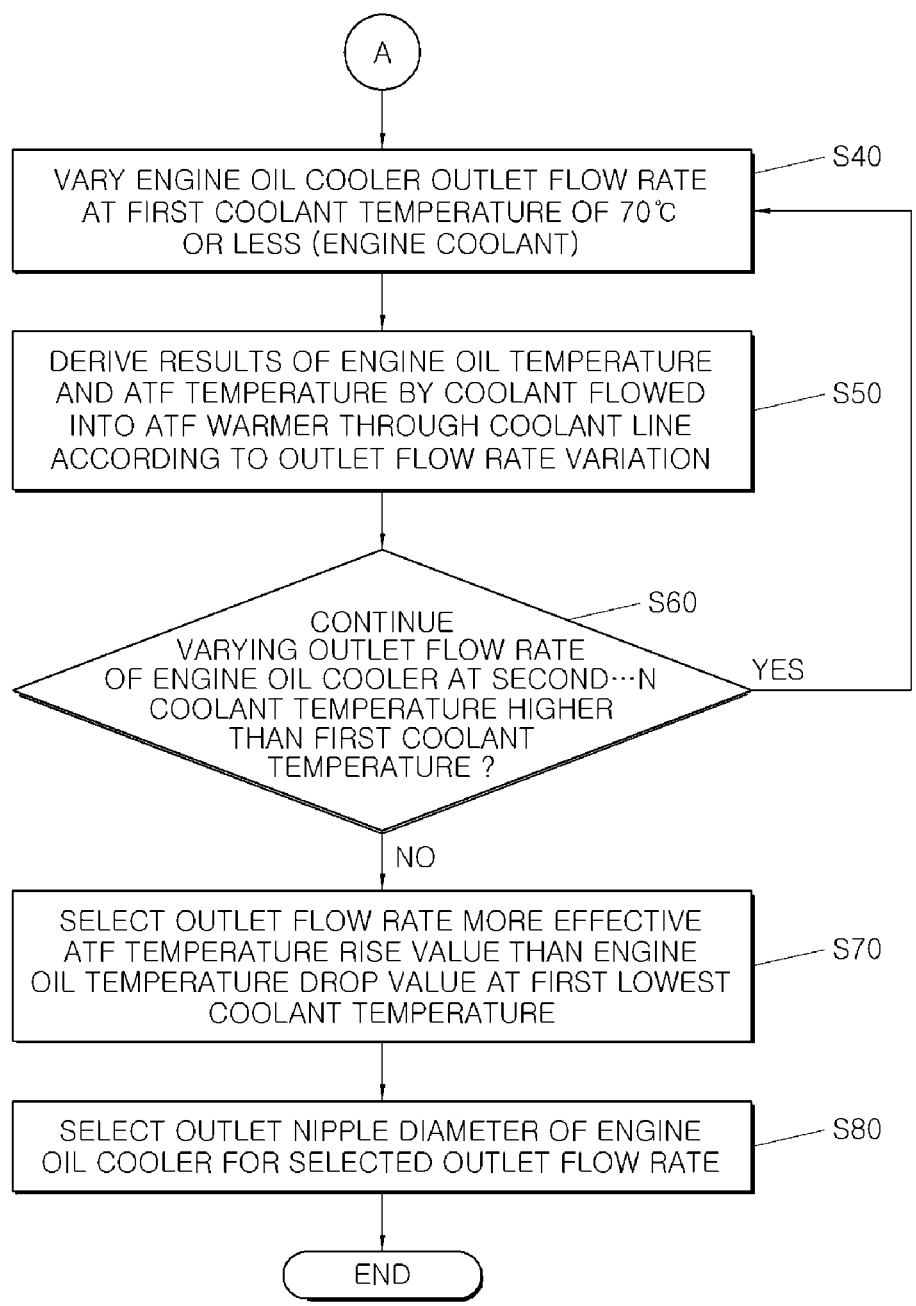
FIG. 3A and FIG. 3B are an experimental example of the ATF warmer coolant distribution optimization when designing the ATF warmer coolant circulation system according to the present invention.

Meanwhile, FIG. 3A and FIG. 3B show the experimental example in which the coolant outlet nipple 5-1 more effective to a rise value of the ATF temperature than a drop value of the engine oil temperature is selected.

As shown, the engine oil/ATF means the percentage obtained by dividing a drop value of the engine oil temperature to a rise value of the ATF temperature, and the ATF/engine oil means the percentage obtained by dividing a rise value of the ATF temperature to a drop value of the engine oil temperature. These mean that the dropping of the engine oil temperature and the rising of the ATF temperature are optimal states each other at different engine coolant temperatures or at same engine coolant temperature. As an example, exemplary embodiment represents that the engine oil temperature is about 40° C. and at the same time, the ATF temperature is about 32° C. at the engine coolant temperature of 56° C. when the diameter of the coolant outlet nipple 5-1 is about 11.8 mm.

Figure 4:
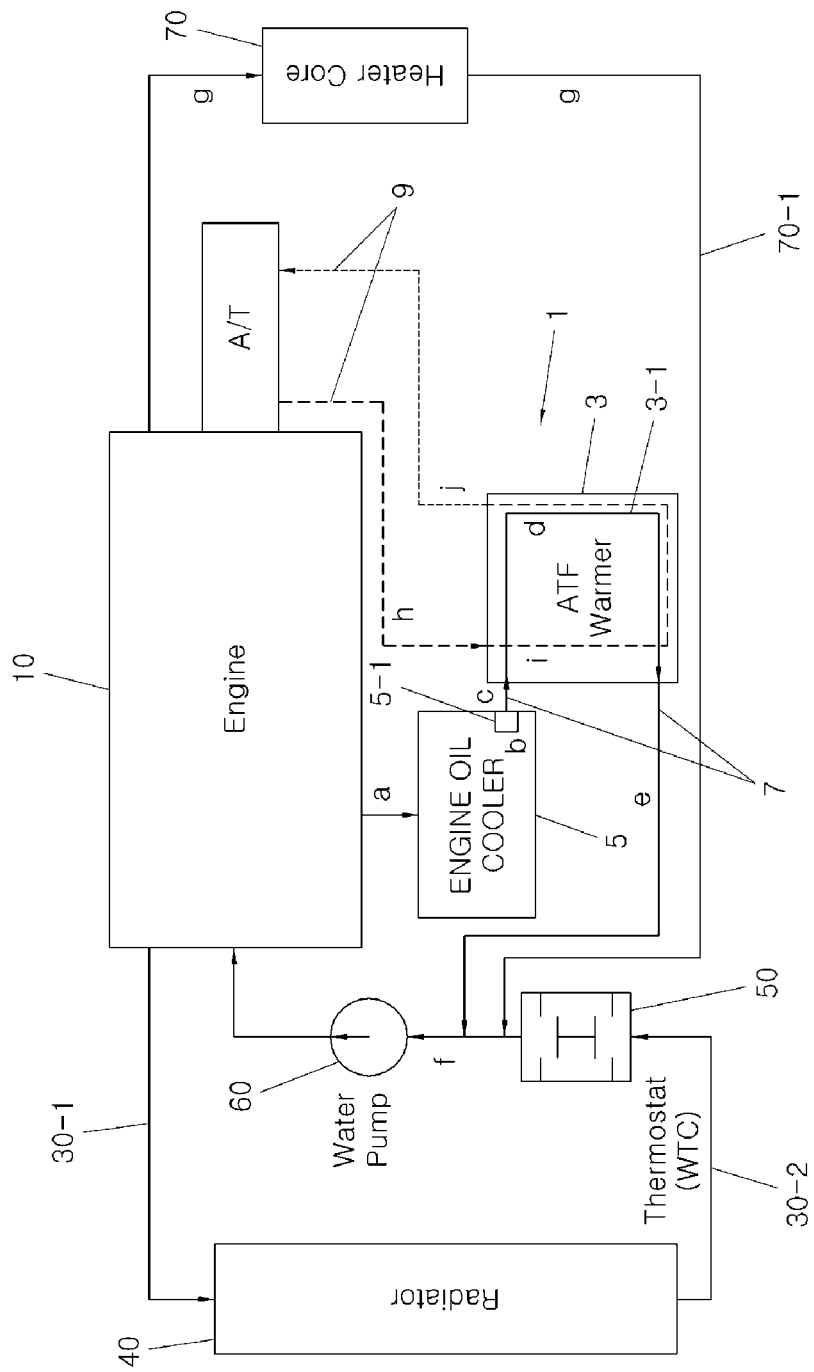
FIG. 4 is a diagram showing operation states of the ATF warmer coolant circulation system according to the present invention in which the ATF warmer coolant distribution is optimized.

Meanwhile, FIG. 4 shows operation states of the ATF warmer coolant circulation system 1. The operation states will be described by dividing an ATF preheating state that the ATF is preheated as the ATF warmer coolant circulation system 1 is operated at the engine coolant temperature of 70° C. or less and an ATF temperature elevation state that the ATF is heated as the ATF warmer coolant circulation system 1 is operated at the engine coolant temperature of 70° C. or more.

Concretely, the ATF preheating state may be based on the premise that the engine coolant circulation through the engine cooling system is not formed since the engine coolant temperature is 70° C. or less. Therefore, the engine coolant flow flowing towards the ATF warmer 3 may be circulated from the engine 10→the engine oil cooler 5→the coolant outlet nipple 5-1→an inflow line of the ATF coolant line 7→the ATF heat-exchanging line 3-1 of the ATF warmer 3→an outflow line of the ATF coolant line 7→the coolant return line 30-2→to the engine 10. That is, the engine coolant for the ATF warmer 3 flows in order of a→b→c→d→e→f→a. On the contrary, the engine coolant flow flowing towards the heater core 70 may be circulated from the engine 10→the heater core coolant line 70-1→the heater core 70→the heater core coolant line 70-1→the coolant return line 30-2→to the engine 10. That is, the engine coolant for the heater core 70 flows in order of a→g→f→a. The ATF flow flowing towards the ATF warmer 3 may be circulated from the transmission 20→the low temperature ATF line of the ATF line 9→the ATF warmer 3→the high temperature ATF line of the ATF line 9→to the transmission 20. That is, the ATF flows in order of h→i→j. Here, "→" means the flow direction of the engine coolant and the ATF.

As a result, the low temperature ATF flowing out of the transmission 20 is heat-exchanged with the engine coolant flowing into the ATF heat-exchanging line 3-1 of the ATF warmer 3 such that the ATF is heated to the high temperature ATF and then is returned to the transmission 20, and the engine coolant flowing out of the ATF warmer 3 is returned to the engine 10 again through the coolant return line 30-2. Even though this processes are not short of the ATF temperature rise by the engine coolant temperature of 70° C. or more, but increase the ATF temperature, whereby more rapid temperature rise of the ATF can be achieved at the engine coolant temperature of 70° C. or more thereafter. In addition, the heater core 70 may form a separate engine coolant flow such that the heating performance can be maintained regardless of the operation of the ATF warmer 3.

Concretely, since the ATF temperature elevation state may be based on the premise that the engine coolant circulation through the engine cooling system is formed since the engine coolant temperature is 70° C. or more. Therefore, the engine coolant flow flowing towards the radiator 40 may be circulated from the engine 10→the coolant discharge line 30-1→the radiator 40→the coolant return line 30-2→the thermostat 50→the water pump 60→to the engine 10. Furthermore, the engine coolant flow flowing towards the heater core 70 may be circulated from the engine 10→the heater core coolant line 70-1→the heater core 70→the heater core coolant line 70-1→the coolant return line 30-2→to the engine 10. On the contrary, the engine coolant flow flowing towards the ATF warmer 3 and the ATF flow flowing towards the ATF warmer 3 may be formed in the same manner as the ATF preheating state. Here, "→" means the flow direction of the engine coolant and the ATF.

As a result, the engine coolant flow flowing towards the radiator 40, the engine coolant flow flowing towards the heater core 70 and the engine coolant flow flowing towards the ATF warmer 3 are each independently formed. Therefore, the ATF preheated by the engine coolant of 70 or less may be rapidly heated by the engine coolant of 70 or more, thereby rapidly improving the transmission transfer efficiency and improving the fuel efficiency through the rapid improvement of the transmission transfer efficiency.

As described above, the ATF warmer coolant circulation system according to the present various embodiments is configured with the ATF warmer 3 to which the engine coolant is supplied by using the ATF coolant line 7 connected to the engine oil cooler 5, and the engine coolant is circulated towards the ATF warmer 3 in order to preheat the ATF of the transmission 20 below the operation temperature of the ATF warmer 3, thereby maintaining the heating performance in the low temperature condition and improving the fuel efficiency through the transmission transfer efficiency improvement by the rapid temperature rise of the ATF. Particularly, the coolant lines downsizing and valves elimination can be achieved by serial layout of the engine oil cooler 5 and the ATF warmer 3, thereby reducing cost and weight.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automatic transmission fluid (ATF) warmer coolant circulation system, comprising:
   an ATF warmer connected to an engine oil cooler, wherein engine coolant is circulated to the ATF warmer to preheat automatic transmission fluid of a transmission below an operation temperature of the ATF warmer,
   wherein a coolant outlet nipple for discharging the engine coolant to the outside is further provided to the engine oil cooler, and
   wherein a diameter of the coolant outlet nipple is selected from a percentage obtained by dividing a drop value of an engine oil temperature to a rise value of an ATF temperature or a percentage obtained by dividing the rise value of the ATF temperature to a drop value of the engine oil temperature.

2. The automatic transmission fluid (ATF) warmer coolant circulation system of claim 1, further comprising:
   an ATF coolant line for introducing engine coolant; and
   an ATF line for circulating the ATF.

3. The automatic transmission fluid warmer coolant circulation system of claim 1, wherein the engine coolant is configured to be supplied to the ATF warmer after passing through the engine oil cooler connected to an engine and then returned to the engine, and the ATF is supplied to the ATF warmer through an ATF line connected to the transmission and then returned to the transmission.

4. The automatic transmission fluid warmer coolant circulation system of claim 3, wherein the ATF warmer forms an ATF heat-exchanging line therein, and the engine coolant flowing in the ATF heat-exchanging line and the ATF flowed in through the ATF line are heat-exchanged with each other.

5. The automatic transmission fluid warmer coolant circulation system of claim 3, wherein the engine oil cooler and the ATF warmer are connected via an ATF coolant line, and the ATF coolant line is connected with a coolant return line for returning the engine coolant to the engine.

6. The automatic transmission fluid warmer coolant circulation system of claim 5, wherein a thermostat and a water pump are installed at the coolant return line, and the ATF coolant line is connected between the thermostat and the water pump.

7. The automatic transmission fluid warmer coolant circulation system of claim 6, wherein the coolant return line is configured to be withdrawn from a radiator, and the radiator is connected with the engine via the coolant return line.

8. The automatic transmission fluid warmer coolant circulation system of claim 5, wherein a heater core coolant line configured to be withdrawn from the engine and at which the heater core is installed is connected to the coolant return line, and the heater core coolant line and the ATF coolant line are separated from each other.

9. A design method of an automatic transmission fluid (ATF) warmer coolant circulation system, comprising:
   system building, where an ATF warmer and an engine oil cooler are selected, the ATF warmer is connected to the engine oil cooler via an ATF coolant line to comprise the ATF warmer coolant circulation system so that the ATF of an transmission circulating the ATF warmer is preheated by heat-exchanging with engine coolant passing through a coolant outlet nipple of the engine oil cooler, and the ATF warmer coolant circulation system is built as an engine system along with an engine, an engine cooling system and a heater core;
   optimization analysis, where the engine system is operated, the effects of the engine coolant flow rate passing through a specific diameter of the coolant outlet nipple on an engine oil temperature drop and on an ATF temperature rise are detected according to change of the engine coolant temperature of 70° C. or less and that is repeatedly performed with changing the diameter of the coolant outlet nipple, and the repeated experiment results are analyzed as performance by engine coolant temperature at an experiment device connected with an engine Electronic Control Unit (ECU); and
   nipple diameter optimization, where the diameter of the coolant outlet nipple applied to the engine oil cooler is selected to a diameter representing the higher ATF temperature rise than the engine oil temperature drop among a number of experimented diameters,
   wherein an ATF temperature and the engine oil temperature are converted to a percentage obtained by dividing a drop value of the engine oil temperature to a rise value of the ATF temperature or a percentage obtained by dividing the rise value of the ATF temperature to a drop value of the engine oil temperature, and
   wherein the percentage obtained mean that the dropping of the engine oil temperature and the rising of the ATF temperature are optimal states each other at different engine coolant temperatures or at same engine coolant temperature.

10. The design method of an automatic transmission fluid warmer coolant circulation system of claim 9, wherein the diameter selection of the coolant outlet nipple is achieved at the lowest coolant temperature.

11. The design method of an automatic transmission fluid warmer coolant circulation system of claim 9, wherein the diameter selection of the coolant outlet nipple is achieved at the coolant temperature higher ATF temperature rise value than engine oil temperature drop value among same coolant temperatures.

* * * * *